United States Patent
Matsushima et al.

[11] Patent Number: 5,875,348
[45] Date of Patent: Feb. 23, 1999

[54] INFORMATION PROCESSING SYSTEM

[75] Inventors: Shinji Matsushima, Yokohama; Saiichi Kawano, Sagamihara; Masayoshi Nakano, Yokohama; Yuichi Shiraishi, Yamato, all of Japan

[73] Assignee: International Business Machines Corporation, Armonk, N.Y.

[21] Appl. No.: 722,281

[22] Filed: Sep. 26, 1996

[30] Foreign Application Priority Data

Sep. 26, 1995 [JP] Japan ..................... 7-247152

[51] Int. Cl.⁶ ........................................ G06F 11/00
[52] U.S. Cl. ................ 395/824; 395/182.12; 395/750.04
[58] Field of Search .................... 395/821, 735, 395/307, 750.03, 750.04, 750.07, 750.08, 182.2, 182.12

[56] References Cited

U.S. PATENT DOCUMENTS

| | | | |
|---|---|---|---|
| 5,293,494 | 3/1994 | Saito et al. ............................. | 395/653 |
| 5,423,045 | 6/1995 | Krishnamurthi et al. .......... | 395/750.05 |
| 5,548,766 | 8/1996 | Kaneko et al. ........................ | 395/307 |
| 5,623,677 | 4/1997 | Townsley et al. ................. | 395/750.04 |

*Primary Examiner*—Robert W. Beausoliel, Jr.
*Assistant Examiner*—Pierre Eddy Elisca
*Attorney, Agent, or Firm*—Anthony N. Magistrale

[57] ABSTRACT

Disclosed is a computer system that includes a CPU that can be operated both in a normal mode and in a power saving mode. The system further includes at least one peripheral device and a bus for allowing communication between the CPU and the peripheral device. A bus cycle detector monitors a bus cycle on the bus and a condition determiner determines the operation mode for the CPU in a specific bus cycle that is detected by the bus cycle detector. A signal generator is used to provide to the CPU, a control signal for changing the CPU's operation mode in accordance with a determination result obtained by the condition determiner. The disclosed system can reduce the operating frequency of a CPU or halt the operation of the CPU in accordance with an appropriate timing even when asynchronous communication is performed with peripheral devices.

15 Claims, 10 Drawing Sheets

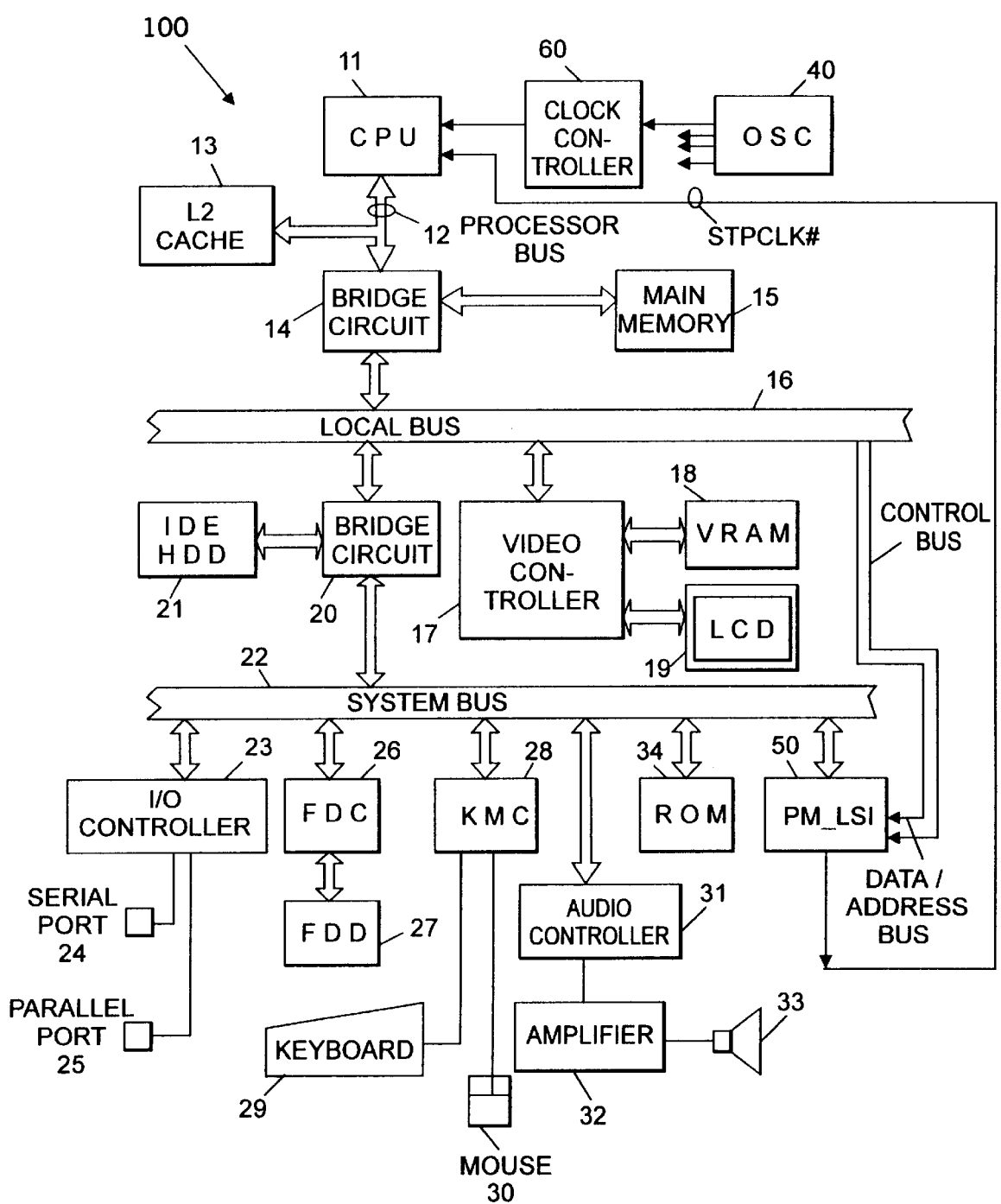

INFORMATION PROCESSING SYSTEM

BACKGROUND OF THE INVENTION

1. Field of the Invention

The present invention relates to an information processing system, such as a personal computer (PC), and in particular to an information processing system with a power saving function that reduces the operating frequency of a processor (e.g., central processing unit (CPU)), or that halts the operation of the processor in order to reduce power consumption.

2. Description of Related Art

Various types of personal computers (hereafter referred to as "PCs" or "systems"), such as desktop and notebook computers, are currently being manufactured and sold. The notebook PCs that are being manufactured are compact and light, since portability and outdoor use are taken into consideration for their design.

Power Management of a Personal Computer

One of the features of notebook PCs is that they are battery operated and can be used at sites where there are no commercially available power sources. A battery that is incorporated in a notebook PC is commonly formed as a "battery pack", which is a package that is comprised of a plurality of rechargeable battery cells (also called a "secondary cell"), such as Ni—Cd, NiMH, or Li-Ion. Although such a battery pack is reusable by being charged, its duration for powering a notebook PC is only two to three hours. Therefore, various ideas for power saving have been implemented in order to extend the duration of the incorporated battery pack. The power saving function can be another feature of a notebook PC.

At present, from an ecological point of view, the demand for power saving is increasing, even for desktop PCs to which power can be supplied almost endlessly by commercially available power sources. In June 1993, the U.S. Environmental Protection Agency (EPA) advocated the self-control action that is called the "Energy Star Computer Program", and required that power consumed in the standby state be less than a predetermined value (driving power is to be 30 W or lower, or 30% or less than it is when the CPU is active). Computer makers have developed and manufactured products that conform to the restriction suggestions. For example, desktop PCs that have a power saving function are already sold by IBM (e.g., the PS/55E (for which "Green PC" is a common name), IBM PC 750, and the Aptiva series ("Aptiva" is a trademark of IBM Corp.)).

Power saving with a PC can be accomplished by, for example, reducing power consumption of the individual electric circuits during the operation. Power savings can also be provided by reducing or halting, as needed, the power supply to the individual electric circuits (or devices) in accordance with the reduction of their activity. The latter power saving function may especially be called a "Power Management" function.

The power management modes of a PC are, for example, an "LCD backlight-OFF" mode and an "HDD-OFF" mode, which halts the power supply to devices, such as a liquid crystal display (LCD) and its backlight, or a hard disk drive (HDD), that account for the greatest share of the total power consumption by a full system. Other example power management modes are a "CPU slow clock/stop clock" mode, in which the operating frequency of a CPU is reduced or the operation of the CPU is halted, and a "Suspend" mode. In a Suspend mode, the power supplied to all the electric circuits, except for a main memory, is halted after the necessary data are saved in the main memory.

Power Management Function of a CPU

As is well known, CPUs are the units that constitute the nuclei for the computations that are performed by computer systems. Recently, according to the improvement of techniques for manufacturing semiconductor devices, the operational frequencies of CPUs have increased even further. For example, there have appeared CPU chips that can be driven at operational frequencies that exceed 100 MHz. One example is the "Pentium" processor sold by Intel Corp., and another example is the "PowerPC" processor ("PowerPC" is a trademark of IBM Corp. PowerPC is jointly developed by IBM Corp., Motorola Corp. and Apple Corp.). The performance of a CPU and its operating frequency are very closely related. And as the operational speed of a CPU rises, the calculating speed also increases accordingly. A fast CPU demonstrates its excellent capability especially when running large application programs and when performing graphics procedures.

However, the high processing speed of the CPU brings several problems. One of the problems concerns the increased power consumption by the CPUs and the consequent heat generation. As the intensity of a current that flows across a transistor (i.e., a resistor) per unit time increases, the power consumption and the heat generation also increase. Theoretically, the power that is consumed by a CPU is proportional to the operating frequency. Currently, the ratio of the power consumption of a CPU to the total power consumption by the system cannot be ignored.

The power management functions of the CPU, such as the "CPU slow-clock/stop-clock," are provided to overcome the above described condition. The "slow-clock" and the "stop-clock" are modes in which, when it is determined that the CPU is in the standby state because key input or mouse input has not been performed for more than a predetermined time, power consumption is reduced by lowering the operating frequency of the CPU, or by halting its operation (i.e., the performance of the CPU is lowered). However, it should be noted that the performance of the CPU can be lowered only up to the point at which neither turn-around time (i.e., the time that elapses from the reception of a request until the generation of an affirmative response) nor through-put (the amount of jobs per unit time) is reduced.

The slow clock function of the CPU can be achieved by changing the frequency of a clock signal that is inputted by an external device (for example, an oscillator). This function can also be achieved by changing a CPU chip's internal operating frequency while maintaining a constant externally input clock frequency. A high speed processing CPU ordinarily receives a relatively low clock signal (for example, 66 MHz) and internally increases the speed of an operation clock (to, for example, 133 MHz) by using an incorporated Phase Lock Loop (PLL) circuit. Such a CPU is a so-called "double speed" chip. It is difficult for this type of CPU to drastically change a clock frequency that is inputted by an external device because of the operating property of a PLL circuit (e.g., there is a wait of several milliseconds before a phase lock loop is locked). Therefore, with another method, for a CPU chip that incorporates both a PLL circuit and a slow clock function, the PLL circuit increases an inputted clock speed while the internal slow clock function autonomously lowers the performance of the CPU.

FIG. 1 is a schematic diagram illustrating the arrangement of a CPU that incorporates a power management function. In FIG. 1, a CPU chip 11 comprises a functional unit 11a that performs computation; a PLL circuit 11b that produces, to the functional unit 11a, an operation clock signal for synchronous driving; and a performance controller 11c that controls the performance of the functional unit 11a. The CPU chip 11 communicates with its peripheral devices (not shown) via a processor bus 12.

The function of a PLL circuit whereby the frequency of an input clock signal is multiplied is well known. The PLL circuit 11b accelerates the speed of a relatively slow lock signal (66 MHz, for example) that is inputted from OSC 40 to an operating frequency (133 MHz, for example), and supplies the doubled clock signal to the functional unit 11a.

The functional unit 11a can be divided into a calculation unit 11d and an internal cache/control unit 11e. The calculation unit 11d is a section whose performance can, to a degree, be reduced in accordance with the activity of the system. The internal cache/control unit 11e is a section that must respond to requests, such as a cache snoop, an interrupt request (INTR/NMI/SMI), or a hold request (HOLD), that is issued in a time critical manner and nonperiodically, and, thus, its performance cannot be easily reduced even if the activity of the system is lowering.

The performance controller 11c controls the performance of the functional unit 11a in response to a control signal STPCLK# that is received from an external device. More specifically, while the STPCLK# is active (i.e., low), the controller 11c halts the supply of the operating clock signal to the calculation unit 11d. The CPU chip 11 is designed such that its performance can be reduced partially. As a modification method, the STPCLK# that is to be inputted to the performance controller 11c is intermittently changed to active (i.e., goes low) to reduce the frequency of the operation clock supplied by the PLL circuit 11b. For example, if the STPCLK# is set active (i.e., goes low) for a predetermined cycle and then the frequency of the operation clock is reduced by one of n times, the performance and power consumption of the calculation unit is reduced to about (n−1)/n. The function that intermittently drives the STPCLK# input operation is generally called "Clock Throttling" or "Frequency Emulation". The STPCLK# is one of the control signals on the processor bus 12.

SL enhanced Intel 486, DX2; s, DX4s, and Pentiums, which are chips that have succeeded the "80486" CPU chip from Intel Corp., have the power saving function that is shown in FIG. 1.

The "stop clock" function is the one in which all clock input is prevented and in which the entire functional unit is halted. The complete stopping of the operational clock can be accomplished by a fully static configuration of the CPU in which a storing and saving function is not required. During the "stop clock" mode, the power consumption of the CPU is, at most, several hundreds of mW.

Another problem that arises as the processing speed of a CPU becomes greater is that there is an increase in the differences between the operating speeds of the CPU and external devices (e.g., a main memory and other peripheral devices). When the speed of the CPU is increased, the speed increase is useless unless the peripheral devices are so designed as to match the increased speed of the CPU. However, it is difficult to eliminate the speed gap between them. For example, the operations performed by a hard disk drive include mechanical operations such as a magnetic head seek, so that any increase in its processing speed is limited. As a result, almost all the peripheral devices are operated asynchronously with the CPU. The communication speed between the CPU and the peripheral devices is determined in accordance with the lower speed of the peripheral devices, so that the CPU is always waiting.

Normally, asynchronous communication between devices is facilitated by handshaking (i.e., by acquiring the timing for data transmission and reception). The manner where the CPU executes the handshaking operation differs in accordance with the types of peripheral devices at the reception source, as is shown in the example in FIG. 2.

When the CPU performs asynchronous communication with a floppy disk drive (FDD), the CPU first instructs a floppy disk controller (FDC) to begin the rotation of a motor (motor ON). The motor is activated by setting a motor-ON bit at I/O port 3F2h of the FDC. Then, 500 msecs later, the CPU transmits a command to the FDC, and thereafter the FDC executes a DMA data transfer from the FDD. After the DMA transfer is completed, the FDC transmits an interrupt request (IRQ6) to the CPU. In response to this request, the CPU reads the status register (I/O port 3F4h) of the FDC to ascertain whether the DMA transfer has been completed without any errors. The above mentioned time out value, 500 msecs, is the time that is required for the rotation of the motor to be stabilized, and is determined based on the specifications for the FDD.

When accessing a keyboard, the CPU first reads the status register (I/O port 64) of a keyboard/mouse controller (KMC), and as a flag, sets the least significant bit of the I/O port 64 to "1". The CPU continues polling the first lower bit for a predetermined time period (for example, 2 seconds) to determine whether or not the keyboard has read the flag and has reset it to "0". If the flag is not reset within the predetermined time period, the program of the CPU (BIOS) jumps to an error routine. The above mentioned time out value, 2 seconds, is determined based on the specifications for the keyboard.

To perform asynchronous communication with a hard disk drive, the CPU first transmits a command (data request) to the HDD, and 200 msecs later the CPU begins the data transfer. The data transfer is performed by units of one sector (=512 bytes) each. Each time the transfer for one sector has been completed, the HDD transmits an interrupt request (IRQ14). The CPU, responsive to the interrupt request, reads the status register (I/O port 1F7h) of the HDD and ascertains whether the data transfer has been completed without any errors. The above mentioned time out value, 200 msecs, is the time that the HDD requires for data buffering, and is determined based on the specifications for the HDD.

As is shown in FIG. 2, most of the handshaking operations include a time counting (time out) routine. During the course of the time counting routine, the CPU inevitably waits until a predetermined time has elapsed. In the above described example, the time out value is 500 msecs for the FDD, 2 seconds for the keyboard, and 200 msecs for the HDD. A compatible computer of the IBM PC/AT series performs the time out routine by permitting the CPU (more specifically, a BIOS that controls the operation of the peripheral devices by employing hardware for asynchronous communication) to count DRAM refresh timer signals. The DRAM refresh timer signals, which are generated by a programmable interval timer (PIT), switches its low/high level every 15.2 μsec. Since the timer signals are outputted at the I/O port 061h, the BIOS accesses the I/O port 061h frequently during a handshaking operation.

As previously mentioned, to perform asynchronous communication, the processing speed is determined in accordance with the slower speed of a peripheral device, and the CPU must wait. From the view point of power management, the performance of the CPU should be reduced during asynchronous communication. The CPU, however, must perform the above described time out function because exact execution of the handshaking operation requires it. If this need is disregarded and a "slow clock" or a "stop clock" is performed, the CPU (more specifically, the BIOS) will obtain an erroneous count for the timer signals (e.g., the DRAM refresh timer signals at the I/O port 61) and will not acquire an exact time out value. As a result, security of the system cannot be maintained. In short, the demands of power management and of system security conflict.

With system security being considered more important, almost all the current PCs operate their CPUs at full speed and in normal mode (i.e., with a high operation clock frequency) during asynchronous communication. The systems are designed so that even when the CPU is being operated in a slow clock mode, the CPU is returned to the normal mode for asynchronous communication. Regardless of how much the activity of the CPU is reduced, power saving procedures involving the CPU cannot begin during asynchronous communication. As a result, even if a CPU chip incorporates the power saving function of FIG. 1, for example, the system can employ this function only when the CPU has entirely fallen into a standby state. The CPU entirely falls into the waiting state only on limited occasions, such as when (1) there is no key input for more than a predetermined time period (see, for example, Japanese Examined Patent Publication No. Hei 06-95303); and when (2) a DMA transfer is performed (during a DMA transfer, the CPU relinquishes the right to control the buses) (see Japanese Unexamined Patent Publication No. Hei 06-266462, for example). When the CPU enters the slow clock mode or the stop clock mode during only such short periods of time, the effect of power management is insufficient. It is desirable to extend the periods during which power saving involving the CPU is performed.

OBJECTS OF THE INVENTION

One object of the present invention, therefore, is to provide an information processing system that has a power saving function that can reduce power consumption by reducing the operating clock frequency of a main processor (CPU), or by halting the operation thereof.

It is another object of the present invention to provide an information processing system that can reduce the operating clock frequency of a CPU, or halt the operation of the CPU, while the system satisfactorily responds to power management and system security requests.

It is an additional object of the present invention to provide an information processing system that can reduce the operating clock frequency of a CPU, or halt the operation of the CPU, in accordance with an appropriate timing by understanding (or measuring) the operational state of the CPU.

It is a further object of the present invention to provide an information processing system that can reduce the operating clock frequency of a CPU, or halt the operation of the CPU, in accordance with an appropriate timing even when asynchronous communication with peripheral devices is executed.

SUMMARY OF THE INVENTION

To achieve the above described objects, according to a first aspect of the present invention, an information processing system includes a CPU having two operation modes, a normal mode and a power saving mode. At least one peripheral device is included and a bus is used to allow communication between the CPU and the peripheral device. The system includes a bus cycle detector for monitoring a bus cycle on the bus, a condition determiner for determining an operation mode of the CPU in a specific bus cycle that is detected by the bus cycle detector and a signal generator for providing, to the CPU, a control signal for changing an operating mode in accordance with a determination result by the condition determiner.

The bus cycle detector detects a bus cycle during which an activity of the CPU can be reduced. The condition determiner then determines that the operating mode of the CPU during such bus cycle should be a power saving mode, and, in accordance with a determination result, the signal generator transmits a control signal to have the CPU enter the low power consumption states.

The bus cycle detector need only detect a bus cycle for accessing I/O port 061h (or a bus cycle for counting the timing for the handshaking operation) as a bus cycle during which the CPU should enter the low power consumption states. In such a bus cycle, there is relatively low activity at the CPU, and the operating rate of the CPU can be reduced to such a degree that there will be no mistakes in the counting of DRAM refresh timer signals at the I/O port 061h.

When the information processing system includes at least a hard disk drive as a peripheral device, the bus cycle detector may detect a bus cycle in which the I/O port 1F0h (or a data port for a hard disk drive) is accessed as a bus cycle during which the CPU should enter the low power consumption states. This is because, in such a bus cycle, the communication speed is restricted by a slow HDD, and the activity at the CPU is relatively low.

When the information processing system includes as peripheral devices at least a floppy disk controller and a floppy disk drive, the bus cycle detector may detect a bus cycle in which the I/O port 3F4h is accessed (or a bus cycle in which the status register of the floppy disk controller is accessed) as a bus cycle during which the CPU should enter the low power consumption state. This is because, in such a bus cycle, the CPU merely performs polling, and its operating rate can be reduced.

In accordance with the detection of a bus cycle in which the I/O port 061h is accessed, the condition determiner may shift the operating mode of the CPU to a power saving mode, and may inhibit the return to a normal mode until a bus cycle other than the previously detected bus cycle is detected twice in succession. While the timing for the handshaking operation is being measured, two events may occur: one when only the I/O port 061h access is repeated, as occurs during data transfers with a FDD and a HDD; and the other when the I/O port 061h access and the I/O port 064h access (status reading) are alternately repeated, as occurs when a keyboard is accessed. Therefore, when the condition determiner shifts the condition of the CPU, as is described above, the power saving operation can be executed during the handshaking operation.

Alternatively, the condition determiner may shift the operating mode of the CPU to the power saving mode, in accordance with a detection result for a bus cycle in which the I/O port 1F0h (or the data port of the hard disk drive) is accessed, and may return the operating mode to a normal mode when another bus cycle is detected. One data transfer with the HDD is performed by accessing the I/O port 1F0h 256 times (previously mentioned). When the condition determiner changes the condition of the CPU as is described above, the power saving operation can be performed during the data transfer.

In addition, the condition determiner may shift the operating mode of the CPU to the power saving mode, in accordance with a detection result for a bus cycle in which the I/O port 3F4h (or the status register of the floppy disk controller (FDC)) is accessed, and may return the operating mode to a normal mode when another bus cycle is detected. When the CPU is to transmit commands (including seek, read and write commands) to the FDC, polling of the status register is performed in advance to determine whether or not the FDD is ready. The polling is normally performed a plurality of times. If the condition determiner changes the condition of the CPU as is described above, the power saving operation can be executed during the polling.

The "power saving mode" in the individual aspects of the present invention is an operating mode in which, for example, the frequency of the operational clock for at least one unit part inside the CPU can be reduced or its operation can be entirely halted.

According to the information processing system of present invention, while the measuring for the handshaking operation is performed, the operating clock frequency of the CPU can be reduced, or its operation can be halted, in accordance with an appropriate timing even during asynchronous communication with a peripheral device.

According to the information processing system of the present invention, the operating clock frequency of the CPU can be reduced, or its operation can be halted, in accordance with an appropriate timing, by more exactly ascertaining the period during which data is transferred between the CPU and the HDD.

According to the information processing system of the present invention, the operating clock frequency of the CPU can be reduced, or its operation can be halted, in accordance with an appropriate timing by more exactly determining the period during which polling is performed to obtain the status of the FDC.

That is, the information processing system according to the present invention provides, in units of one bus cycle, the low power consumption by the CPU.

Conventionally, shifting the CPU into the power saving mode while asynchronous communication is in progress will thrust the security of the system into danger. However, with the information processing system of the present invention, since the CPU can enter the power saving mode in accordance with an appropriate timing, the demands for the provision of the power management effect and for the maintenance of the security of the system can be satisfied.

As a secondary effect that is provided by the present invention, the design of software is easier. The asynchronous communication between the CPU and the peripheral device can occur at any time while the CPU is executing the BIOS or any other application programs. Taking all the conditions into account, it is almost impossible, because of time and economical factors, for the design of all the software that may be installed into the system to be so changed as to "reduce the performance of the CPU chip during the handshaking operation". In the present invention, specially designed hardware (a "PM-LSI chip") is employed to accomplish the power saving operation for the CPU chip. Thus, the operating rate of the CPU does not affect the software, and no software design changes are required.

Other objects, features and advantages of the present invention will become readily apparent during the following detailed explanation that is given while referring to the accompanying drawings.

BRIEF DESCRIPTION OF THE DRAWINGS

FIG. 2B showing the handshaking with a KMC, and with FIG. 2C showing the handshaking with the HDD.

FIG. 3 is a block diagram illustrating the hardware arrangement of a personal computer in accordance with the present invention.

FIG. 9B showing the processing for accessing port 1F0h and FIG. 9C showing the processing for accessing port 3F4h.

Figure 1:
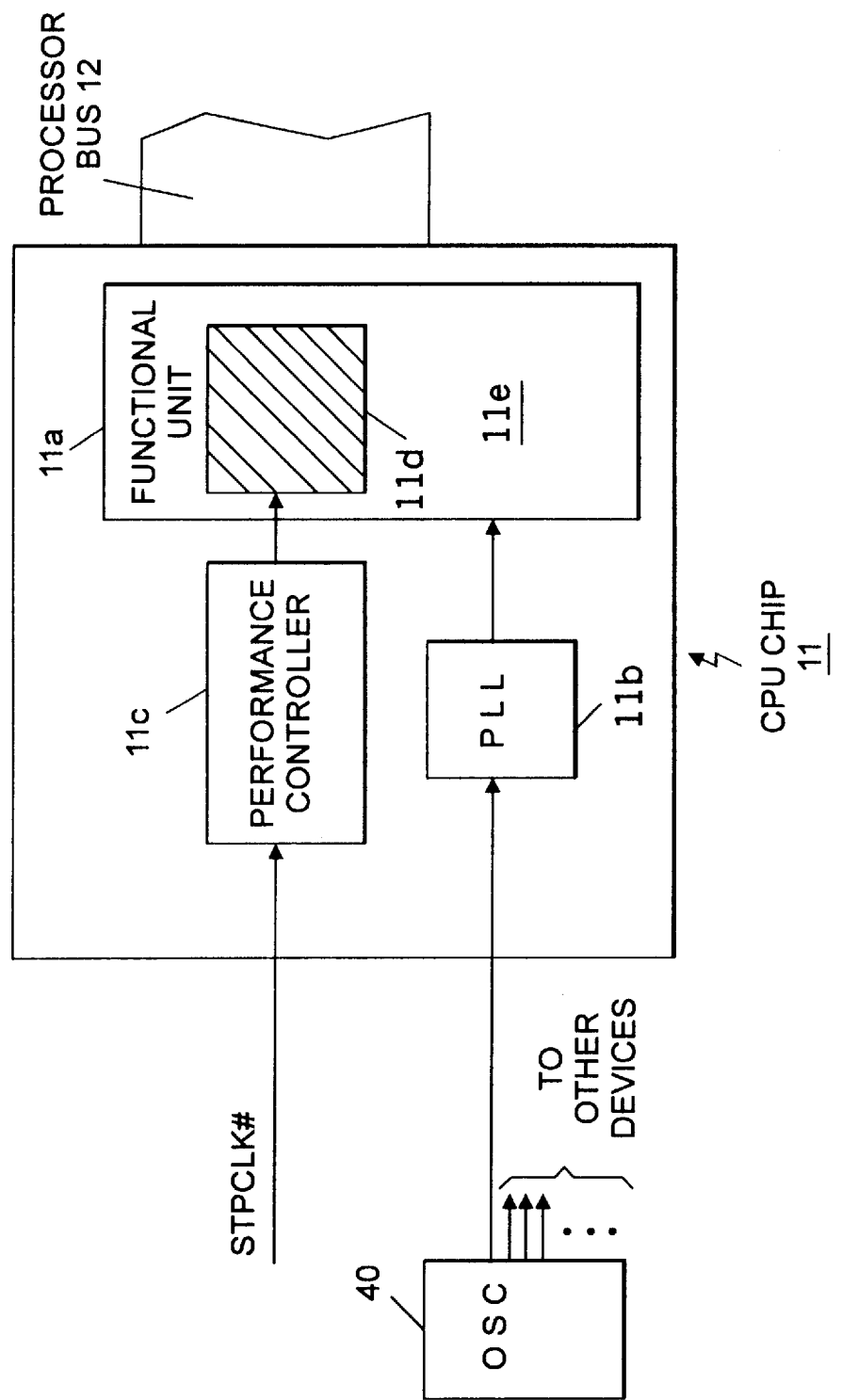
FIG. 1 is a schematic diagram illustrating an arrangement of a CPU that incorporates a power management function.

DETAILED DESCRIPTION OF THE INVENTION (A) Hardware Arrangement of Personal Computer 100

FIG. 3 is a diagram showing the hardware arrangement of a personal computer (PC) 100 that is employed for carrying out the present invention.

A central processing unit (CPU) 11 employs an operating system (OS) to execute various programs. A processor bus 12 that runs from the CPU 11 communicates with the individual peripheral devices (described below) across two bus layers, which are a local bus 16 and a system bus 22. The CPU 11 has substantially the same structure as that shown in FIG. 1. A "Pentium/1xx MHz", which is sold by Intel Corp. may be employed as the CPU 11, for example. The buses 12, 16, and 22 are common signal path lines that each include data bus signals, address bus signals, and control bus signals. The local bus 16 is a relatively high speed bus that connects specific peripheral devices, such as graphic devices. A peripheral component interconnect (PCI) bus, which is prescribed by Intel Corp., is one example of such a local bus 16. The system bus 22 is connected to relatively slow peripheral devices, such as floppy disk drive (FDD) 27 and can be, for example, an industry standard architecture (ISA) bus.

The processor bus 12 and the local bus 16 communicate with each other across a bridge circuit (host-PCI bridge) 14. The bridge circuit 14 in this embodiment includes a memory controller, for controlling the access of a main memory 15, and a data buffer, for absorbing the speed difference between the buses 12 and 16. The main memory 15 is a volatile memory (RAM) in which various programs (the OS and application programs) that the CPU 11 executes are loaded or which the CPU 11 employs as a work area. Dynamic RAM (DRAM), with which for a large memory capacity is relatively inexpensive and available, is employed for the main memory 15, and a capacity of, for example, about 8 megabytes (MB) is considered standard. An external cache 13 (also called a "Level 2 (L2) cache") is provided to absorb the difference between the processing speed of the CPU 11 and the access speed for the main memory 15. The L2 cache 13 is comprised of static RAM (SRAM), which is faster than a DRAM, and has a memory capacity of approximately 256 KB, for example.

Peripheral devices, such as a video controller 17, for which relatively high speed is required, are connected to the local bus 16. The video controller 17 is a peripheral controller for actually processing a drawing command that is sent from the CPU 11. The processed drawing information is temporarily written to a screen buffer (VRAM) 18, and the written information is read from the VRAM 18 and is outputted to a liquid crystal display (LCD) 19, which serves as display means.

The local bus 16 and the system bus 22 communicate with each other across a bridge circuit (PCI-ISA bridge) 20. The bridge circuit 20 in this embodiment includes a direct memory access (DMA) controller, an interrupt controller, and a programmable interval timer (PIT). The DMA controller is a peripheral controller that transfers data between the main memory 15 and peripheral devices (such as an FDD 27 that will be described later), without the involvement of the CPU 11. The interrupt controller handles hardware interrupt requests (IRQ) from the individual peripheral devices and transmits them to the CPU 11. The PIT supplies several types of timer signals to the individual sections of the system 100. A timer signal that is generated by the PIT is, for example, a periodical interrupt (INTR) that is provided to an OS/BIOS at an interval of 55 msecs, a previously mentioned DRAM refresh timer signal, or a tone generation signal for the production of audio sounds.

The bridge circuit 20 further includes an interface (for example, an Integrated Drive Electronics (IDE) interface: originally, IDE was the standard interface for directly connecting a hard disk drive (HDD) to an ISA bus), which connects a HDD 21 that serves as an auxiliary storage device.

The two bridge circuits 14 and 20 are generally provided by a single chip set. A chip set example is "Triton", which is sold by Intel Corp.

The system bus 22 is connected to relatively low speed peripheral devices, such as an input/output (I/O) controller 23, a floppy disk controller (FDC) 26, a keyboard/mouse controller (KMC) 28, an audio controller 31, a ROM 34 and a power management large scale integrated circuit (PM-LSI) 50.

The I/O controller 23 is a peripheral controller for controlling the exchange of data with external devices via a serial port 24 or a parallel port 25. An example of an external device is a modem or a printer (neither of them shown). The FDC 26 is a dedicated controller for driving the FDD 27.

The KMC 28 is a controller for processing an input matrix at a keyboard 29 and a coordinate set that is pointed at by a mouse 30. The KMC 28 converts an input signal into a format that conforms to the definition of the OS and outputs the result to the bus 22.

The audio controller 31 is a peripheral controller for handling input and output of audio signals. One of the functions of the audio controller 31 is the generation of a tone signal based on a specific frequency signal generated by the PIT. The output signal from the audio controller 31 is, for example, amplified by an amplifier 32, and the amplified signal is output through a loudspeaker 33.

The read only memory (ROM) 34 is a nonvolatile memory for which written data are determined at the time of manufacture, and is employed for the permanent storage of predetermined codes. The codes that are stored in the ROM include a test program that is conducted when the system 100 is powered on (power on self test (POST)), and a program for controlling data input and output by the individual hardware components in the system 100 (basic input outpur system (BIOS)).

An oscillator (OSC) 40 supplies an operational clock to a synchronously driven chip, such as the CPU 11. A clock signal is provided to the CPU 11 via a clock controller 60.

The PM-LSI 50 is provided to accomplish an appropriate power management operation for the CPU 11. More specifically, the operation of the local bus 16 is snooped (also called a "bus snoop"), and the STPCLK# is outputted to the CPU 11 at a predetermined timing. The PM-LSI chip 50 is manufactured with a semi-custom design like a gate array. The LSI chip 50 plays a main role in implementing the present invention, and its detailed structure and operational characteristic will be described later in subject divisions C and D.

The clock controller 60 halts, as needed, an input clock that is supplied from the OSC 40 to the CPU 11. As is mentioned above, upon the receipt of a control signal STPCLK#, the CPU 11 can lower or completely halt the operation in the partial functional unit of the CPU chip 11. The clock controller 60 halts the input of clock signals to a PLL circuit 11a to completely halt the operation of the CPU 11.

Almost all the PCs that are currently on sale in the market have hardware components that are equivalent to the block components that are denoted by reference numbers 11 through 40. Although many electric circuits other than those shown in FIG. 3 are required to constitute a PC, as they are well known to a person having ordinary skill in the part, and do not relate to the subject of the present invention, no explanation for these components is given in this specification.

(B) Software Arrangement of PC 100

Figure 4:
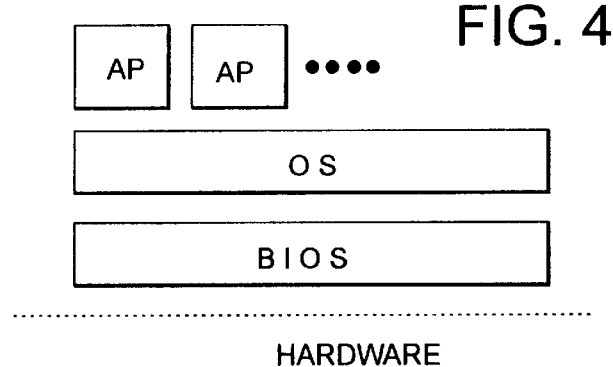
FIG. 4 is a diagram illustrating the software arrangement that can be executed by the personal computer of FIG. 3.

FIG. 4 is a schematic diagram illustrating the software arrangement that can be executed by the PC 100, which is employed for carrying out the present invention.

The software at the lowest layer is a Basic Input/Output System (BIOS). The BIOS is a program assembly that consists of the basic operation commands for controlling the individual hardware components (the video controller 17, the keyboard 29, the HDD 21, and the FDD 27) in the system 100. Upon receipt of a call from a higher layer program (an operating system or application programs, which will be described later), the BIOS performs the actual hardware control. The BIOS includes a boot strap routine that is performed when the system 100 is powered on, and routines for handling interrupt requests generated on the bus 16 or 22.

The operating system (OS) is the basic software for totally managing hardware and software within the system 100. OS/2 ("OS/2" is a trademark of IBM Corp.) or Windows ("Windows" is a trademark of Microsoft Corp.), for example, corresponds to the operating system. The OS also includes a "file manager" that handles the recording of files on the HDD 21, a "scheduler" that determines the order of execution of a task for the CPU and the priority order, and a "memory manager" that is responsible for the allocation of memory. Further, a "user interface" (a system command and a system call) that manages the display of windows and the manipulation of a mouse is also included.

The uppermost layer is application programs (AP). Programs for word processing, databases, calculations for charts, communication, etc., correspond to the APs. The APs are loaded, as needed, from the HDD 21 and the FDD 27 to the main memory 15 in accordance with the intent of a user.

The software hierarchial structure shown in FIG. 4 is well known to one having ordinary skill in the art. It will become apparent from the following explanation that any changes in software design at the individual layers is not required.

(C) Arrangement of Power Management LSI

Figure 5:
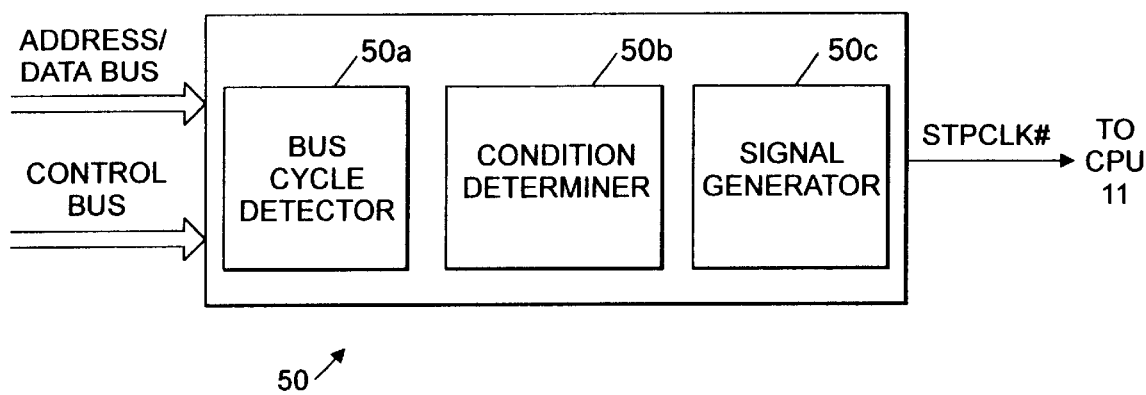
FIG. 5 is a diagram showing the internal arrangement of the power management (LSI) according to one embodiment of the present invention.

FIG. 5 is a diagram showing the internal arrangement of the power management LSI (PM-LSI) 50. The LSI chip 50 is mounted in the PC 100 to appropriately accomplish the power management operation of the CPU according to the present invention.

As is shown in FIG. 5, the PM-LSI 50 includes a bus cycle detector 50a, a condition determiner 50b and a signal generator 50c. The PM-LSI 50 monitors address bus signals, data bus signals and control bus signals that constitute the local bus 16, and outputs the control signal STPCLK# to the CPU 11. STPCLK# is also one of the control signals on the processor bus 12.

(1) Bus Cycle Detector 50a

The bus cycle detector 50a monitors the bus cycle on the local bus 16 (also called a "bus snoop"). When the detector 50a detects that a specific port address has been accessed, it notifies the condition determiner 50b. When a PCI bus is employed for the local bus 16, the signal lines that the bus cycle detector 50a should snoop are all of the 32-bit address/data buses, C/BE (Command/Bus Enable) #, FRAME#, IRDY (initiator Ready) #, and TRDY (Target Ready) #, among the local bus 16. According to the standards for the PCI bus, the address bus and the data bus are multiplexed.

(i) At the time handshaking timing is adjusted

An example bus cycle that the bus cycle detector 50a should detect is an access cycle for port 061h. To the port 061h are assigned DRAM refresh timer signals generated by the programmable interval timer (PIT), and for which the low/high levels are switched every 15.2 $\mu$sec. The CPU 11 (more specifically, the BIOS that controls the hardware components for asynchronous communication) counts the timer signals to acquire a timing for handshaking. The access cycle for port 061h is frequently generated while the BIOS is counting up the DRAM refresh signals, such as until 500 msecs elapses after a command (motor ON of the FDD 27) was sent to the FDC 26, 2 sec after the status reading was performed for the KMC 28 (the port 064h was accessed), or 200 msecs after a command (n sector read/write) was sent to the HDD 21.

Figure 6:
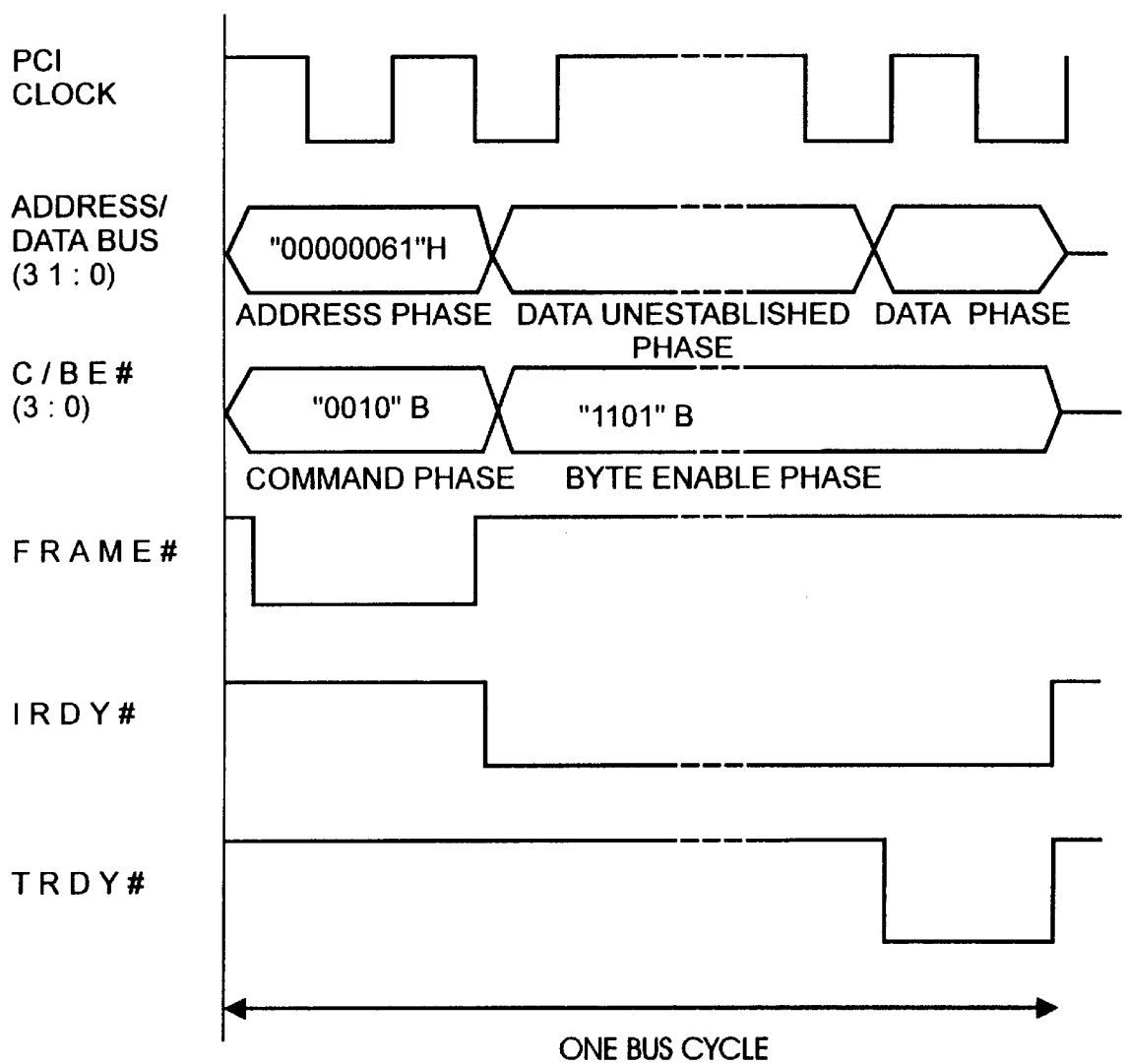
FIG. 6 is a timing chart of a cycle for accessing port 061h which occurs on a PCI bus 16.

FIG. 6 is a timing chart of an access cycle for port 061h that occurs on the PCI bus 16. In the bus cycle, the bridge circuit 14 takes the place of the CPU 11 (BIOS) and serves as an "initiator" that issues a command. A "target" that receives a command is the bridge circuit 20 that has the port 061h.

As is shown in FIG. 6, in the first PCI clock cycle, the address/data bus is in an address phase, and the C/BE# (3:0) is in a command phase. The bridge circuit 14 that acts as an initiator outputs, to the address/data bus, a port address "00000061"h to be accessed, and outputs, to the C/BE# (3:0), the value "0010"b, as the I/O read command. The FRAME# is rendered active (i.e., is pulled low) to indicate the start of the bus cycle.

In the next PCI clock cycle, the address/data bus enters the data unestablished phase. The C/BE# (3:0) enters the byte enabled phase, and the value "1101"b, which indicates the byte position for reading, is transferred.

When the initiator becomes ready, the initiator renders the FRAME# inactive (i.e., pulls it high) and renders the IRDY# active (i.e., pulls it low).

When the target becomes ready, the target renders the TRDY# active (i.e., pulls it low). At this time, the address/data bus has entered the data phase, and in response to the active state at the TRDY#, the transfer of established data is begun.

Then, the IRDY# and the TRDY# are rendered inactive (i.e., pulled high), and the bus cycle is terminated.

(ii) At the time of a data transfer between the CPU and the HDD

Another example bus cycle that should be detected by the bus cycle detector 50a is an access cycle for the port 1F0h. The port 1F0h has a length of 2 bytes (=one word length), and is assigned to a data port for the IDE HDD 21. The data transfer (both reading and writing) for the HDD 21 is performed in units of one sector (=512 bytes). During one data transfer, 256 bus cycles occurs sequentially during which the CPU (more specifically, the BIOS that performs the data transfer) accesses the port 1F0h.

Figure 7:
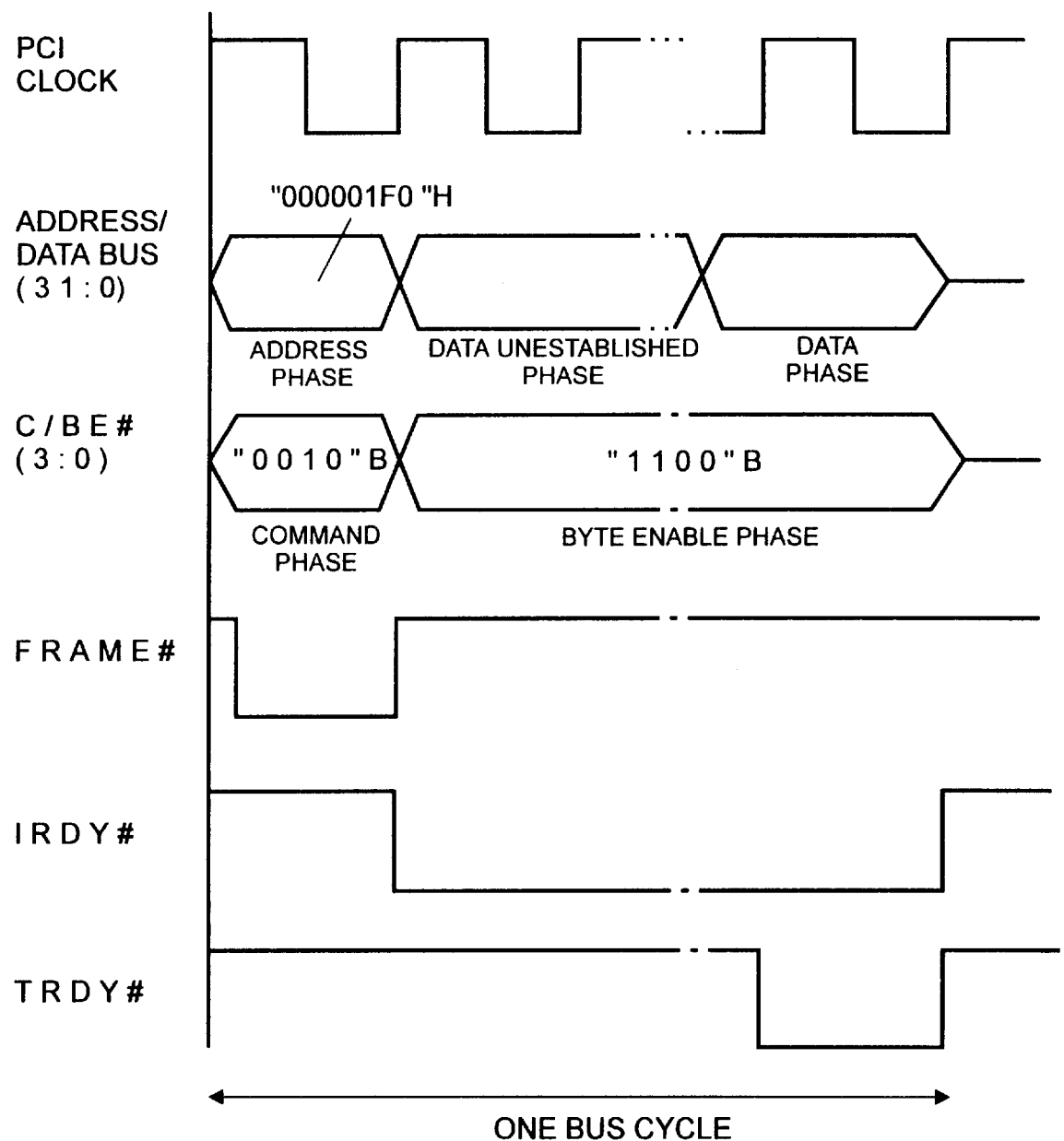
FIG. 7 is a timing chart of a cycle for accessing port 1F0h which occurs on the PCI bus 16.

FIG. 7 is a timing chart showing an access cycle (reading cycle) for port 1F0h that occurs on the PCI bus 16. In this bus cycle, the bridge circuit 14 takes the place of the CPU 11 (BIOS) and serves as an "initiator" which issues a command. A "target" that receives a command is the IDE HDD 21.

As is shown in FIG. 7, in the first PCI clock cycle, the address/data bus is in an address phase, and the C/BE# (3:0) is in a command phase. The bridge circuit 14 that is acting as an initiator outputs, to the address/data bus, port address "000001F0"h to be accessed, and outputs, to the C/BE# (3:0), the value "0010"b, as the I/O read command. The FRAME# is rendered active (i.e., is pulled low) to indicate the start of the bus cycle.

In the next PCI clock cycle, the address/data bus enters the data unestablished phase. The C/BE# (3:0) enters the byte enable phase, and the value "1100"b, which indicates the byte position for reading, is transferred. When the initiator becomes ready, the initiator renders the FRAME# inactive (i.e., pulls it high) and renders the IRDY# active (i.e., pulls it low).

When the target becomes ready, the target renders the TRDY# active (i.e., pulls it low). At this time, the address/data bus has entered the data phase, and in response to the active state of the TRDY#, the transfer of established data is begun.

Then, the IRDY# and the TRDY# are rendered inactive (i.e., pulled high), and the bus cycle is terminated.

(iii) When polling is performed for the status register of the FDC

An additional example of the bus cycle that should be detected by the bus cycle detector 50a is an access cycle for port 3F4h. The port 3F4h is assigned to the status register of the FDC 26. When the CPU 11 transmits a command (e.g., a seek, read, or write command) to the FDC 26, the status should be checked in advance. Before a command is sent to the FDC 26, therefore, the status reading of the FDC 26, i.e., the access of the port 3F4h by the CPU (more specifically, the BIOS that performs polling on the status), is repeated.

Figure 8:
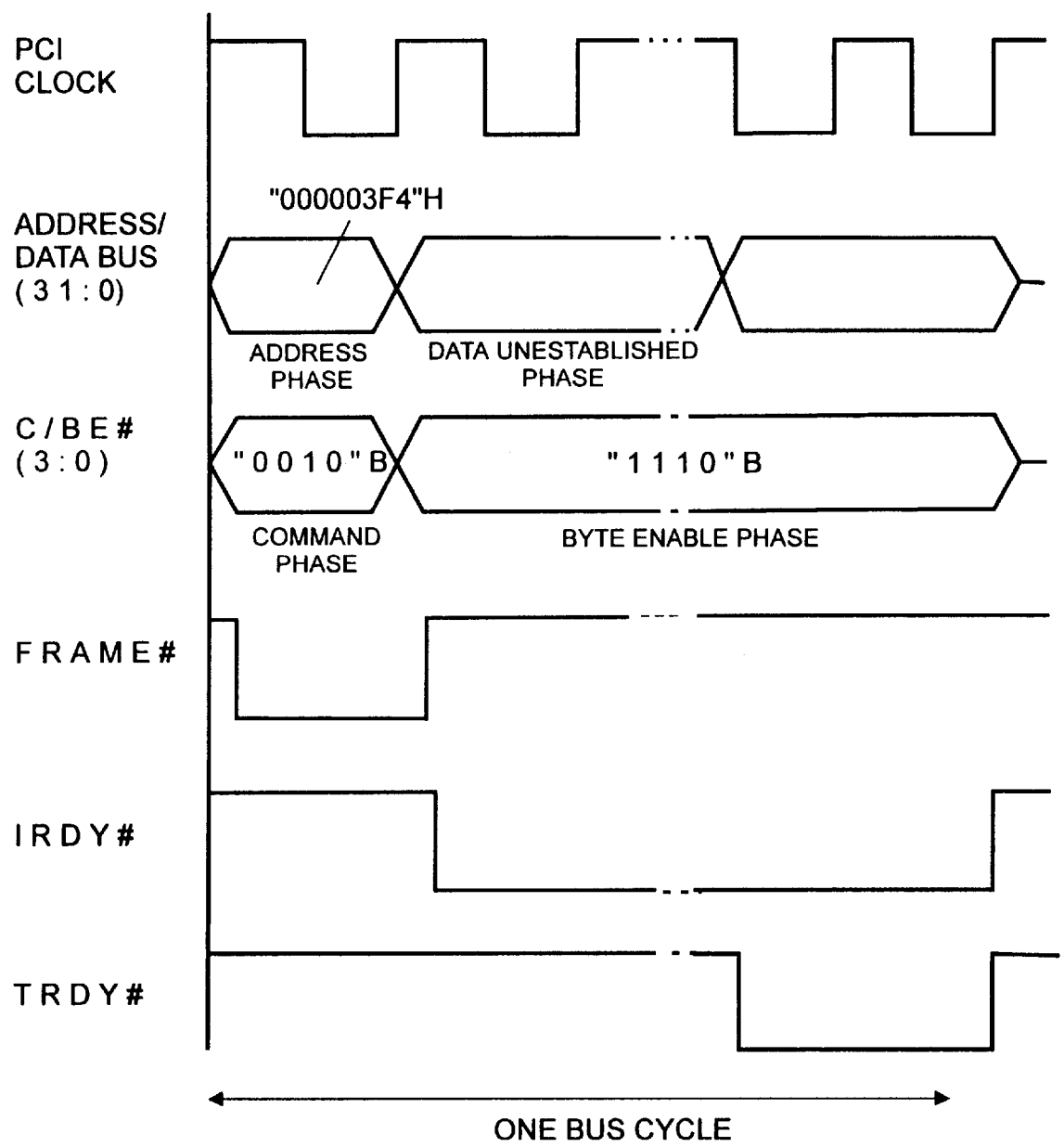
FIG. 8 is a timing chart of a cycle for accessing port 3F4h which occurs on the PCI bus 16.

FIG. 8 is a timing chart showing an access cycle (reading cycle) for the port 3F4h that occurs on the PCI bus 16. In this bus cycle, the bridge circuit 14 takes the place of the CPU 11 (BIOS) and serves as an "initiator" which issues a command. A "target" that receives a command is the FDC 26.

As is shown in FIG. 8, in the first PCI clock cycle, the address/data bus is in an address phase, and the C/BE# (3:0) is in a command phase. The bridge circuit 14 that is acting as initiator outputs to the address/data bus, port address "000003F4"h to be accessed, and outputs to the C/BE# (3:0) the value "0010"b as the I/O read command. The FRAME# is rendered active (i.e., pulled low) to indicate the start of the bus cycle.

In the next PCI clock cycle, the address/data bus enters the data unestablished phase. The C/BE# (3:0) enters the byte enable phase, and the value "1110"b, which indicates the byte position for reading, is transferred.

When the initiator becomes ready, the initiator renders the FRAME# inactive (i.e., pulls it high) and renders the IRDY# active (i.e., pulls it low).

When the target becomes ready, the target renders the TRDY# active (i.e., pulls it low). At this time, the address/data bus has entered the data phase, and in response to the active state of the TRDY#, the transfer of established data is begun.

Then, the IRDY# and the TRDY# are rendered inactive (i.e., pulled high), and the bus cycle is terminated.

It should be understood by one having an ordinary skill in the art that only the 32-bit address/data bus, C/B E#, FRAME#, IRDY#, and TRDY#, among the local bus 16 need only to be snooped so that the bus cycle detector 50a detects the bus cycles shown in FIGS. 6, 7 and 8. The bus cycle detector 50a may snoop not only the local bus 16 but also the system bus 22.

The reason that the bus cycle detector 50a detects accesses of port addresses, 061h, 1F0h and 3F4h, and the obtained effect will become apparent during the course of the following explanation.

(2) Condition Determiner 50b

As previously described, the bus cycle detector 50a in this embodiment detects three kinds of bus cycles: (1) an access cycle for port 061h; (2) an access cycle for port 1F0h; and (3) an access cycle for port 3F4h. The bus cycle detector 50a transmits notification of the detected bus cycle to the condition determiner 50b. In response to this notice, the condition determiner 50b determines whether the CPU 11 should currently be in a normal mode in which the CPU 11 is operated at high speed or in a power saving mode in which the STPCLK# is employed to reduce the performance of the functional unit 11a partially. The condition determiner 50b determines different states in accordance with a received bus cycle access notification.

(i) At the time handshaking timing is adjusted

Figure 9A:
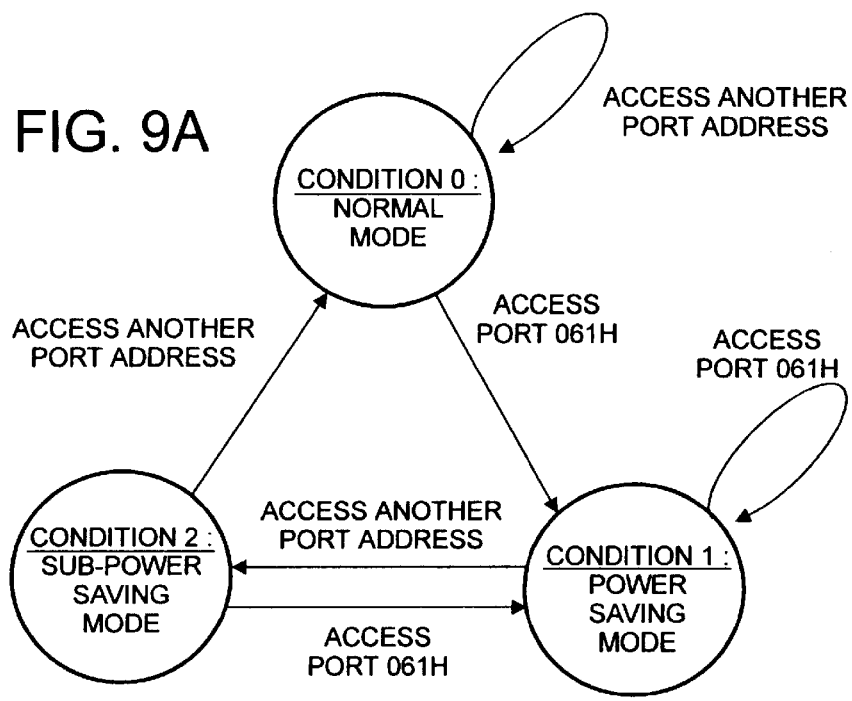
FIGS. 9A–9C are state transition diagrams showing the shifting of operating conditions, which represents the operational characteristic of a condition determiner 50b, with FIG. 9A showing the processing for accessing port 061h.

The access of I/O port 061h occurs when the CPU 11 (BIOS) is adjusting the handshaking timing (previously described). In such a bus cycle, the activity at the CPU 11 is relatively low, so that the performance of the CPU 11 can be reduced to the degree that it doesn't mistakenly count up the timer signals at I/O port 061h that are switched every 15.2 μsec. FIG. 9A is a state transition diagram showing the operation characteristic of the condition determiner 50b when this bus cycle is detected. An explanation will be given while referring to FIG. 9A.

When the CPU 11 is driven in a normal mode, i.e., while it is driven at the highest operational clock, the CPU 11 is set in condition 0. Even if a bus cycle for accessing an address other than I/O port 061h occurs during this period, the operational state is returned to condition 0. When a bus cycle for accessing I/O port 061h occurs during this period, it is assumed that a timing measurement is started by the BIOS, and the operational state is shifted to condition 1 in order to switch the CPU 11 into a power saving mode.

In condition 1, the CPU 11 is driven in the power saving mode. When a bus cycle for accessing I/O port 061h occurs again during this period, it means that the timing measurement is still being performed by the BIOS, and the operational state is returned to condition 1. When a bus cycle for accessing an address other than I/O port 061h occurs during this period, it is assumed that the timing measurement by the BIOS has been completed (i.e., the time out), or that, as when the keyboard 29 is accessed, the timing measurement and the status reading (accessing of I/O port 064h) are alternately repeated by the BIOS. In the latter case, the count up operation by the BIOS has not yet completed (see FIG. 2B, for example). When the other bus access is detected in condition 1, the operational state is not shifted directly to condition 0 (i.e., the normal mode) but to condition 2 (a sub-power saving mode).

In condition 2, i.e., in the sub-power saving mode, the CPU 11 performs the same power saving operation as in condition 1. However, the condition determiner 50b can not determine either that the BIOS has completed the count up operation and the operational mode should be returned to the normal mode, or that the timing measurement by the BIOS is still continuing. When a bus cycle for accessing I/O port 061h is detected again in condition 2, the operational state is shifted to condition 1. When the other bus cycle is detected, it is apparent that the count up operation by the BIOS has completed, and the operational state is moved to condition 0.

(ii) At the time of a data transfer between the CPU and the HDD

Figure 9B:
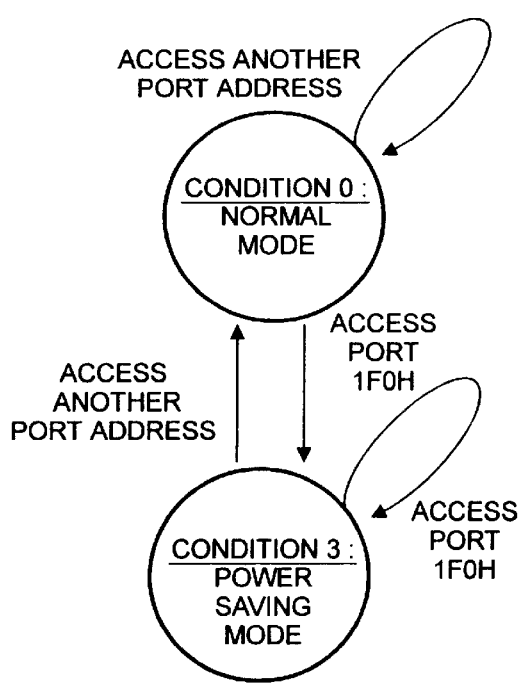

The access cycle for port 1F0h occurs when the data transfer (including reading and writing) is to be performed between the CPU 11 and the HDD 21 (previously described). One data transfer (i.e., the data transfer of one sector) is performed by sequentially accessing I/O port 1F0h 256 times. The data transfer speed is determined in accordance with the speed of the slower HDD 21. Thus, during this access cycle, the activity of the CPU 11 is relatively low, so that the performance of the CPU 11 can be reduced. FIG. 9B is a state transition diagram showing the operation characteristic of the condition determiner 50b when this bus cycle is detected. An explanation will be given while referring to FIG. 9B.

When the CPU 11 is driven in a normal mode, i.e., while it is driven at the highest operational clock, the CPU 11 is set in condition 0. Even if a bus cycle for accessing an address other than I/O port 1F0h occurs during this period, the operational state is returned to condition 0. When a bus cycle for accessing I/O port 1F0h occurs during this period, it is assumed that the data transfer has begun, and the operational state is shifted to condition 3 in order to place the CPU 11 in the power saving mode.

In condition 3, the CPU 11 is driven in the power saving mode. When a bus cycle for accessing I/O port 1F0h occurs again during this period, it means that the CPU 11 is continuing the data transfer with the HDD 21, and the operational state is returned to condition 3. When a bus cycle for accessing an address other than I/O port 1F0h is detected during this period, the operation mode is changed to condition 0, i.e., to the normal mode. It is because the occurrence of the different bus cycle means that the data transfer is terminated.

(iii) When polling is performed for the status register of the FDC

Figure 9C:
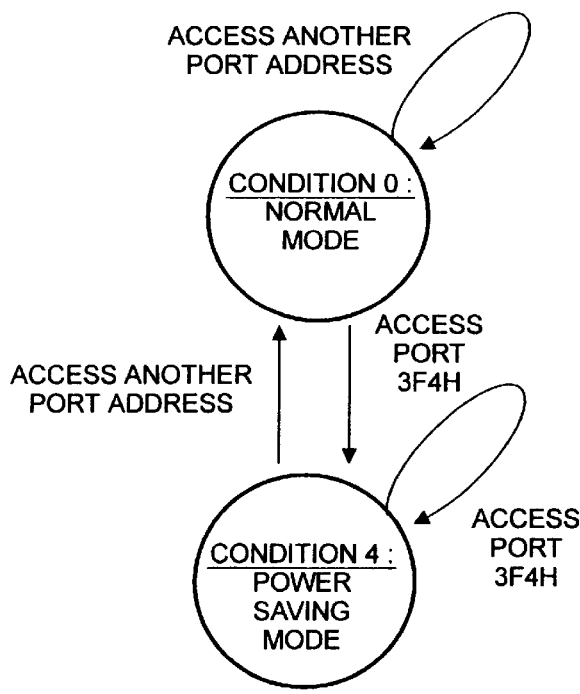

The access cycle for I/O port 3F4h repeatedly occurs before the CPU 11 transmits a command to the FDC 26 (previously described). During the polling of the status register, the activity of the CPU 11 is relatively low, so that the performance of the CPU 11 can be reduced. FIG. 9C is a state transition diagram showing the operation characteristic of the condition determiner 50b when this bus cycle is detected. An explanation will be given while referring to FIG. 9C.

When the CPU 11 is driven in the normal mode, i.e., while it is driven at the highest operational clock, the CPU 11 is set in condition 0. Even if a bus cycle for accessing an address other than I/O port 3F4h occurs during this period, the operational state is returned to condition 0. When a bus cycle for accessing I/O port 3F4h occurs during this period, it is assumed that polling of the status has begun, and the operational state is shifted to condition 4 in order to place the CPU 11 in the power saving mode.

In condition 4, the CPU 11 is driven in the power saving mode. When a bus cycle for accessing I/O port 3F4h occurs again during this period, it means that the polling of the status is continuing, and the operational state is returned to condition 4. When a bus cycle for accessing an address other than I/O port 3F4h is detected during this period, the operation mode is changed to condition 0, i.e., to the normal mode. It is because the occurrence of the different bus cycle means that the polling is terminated.

(3) Signal Generator 50c

Upon the detection of the bus cycle, the condition determiner 50b can determine the time when the CPU can be shifted to the power saving mode (previously described). In accordance with this determination result, the signal generator 50c outputs the STPCLK# to the CPU 11 to actually reduce the performance of the CPU 11.

As is described above, in the periods of condition 1, condition 2, condition 3 and condition 4, which are determined by the condition determiner 50b, the activity of the CPU 11 is relatively low. In other words, the performance of the CPU 11 can be reduced to the degree that turn-around time and through-put are not be deteriorated. The possible reduction in the performance is to the level that ensures the timer signals for I/O port 061h are not mistakenly counted, that ensures the data transfer speed of the HDD 21 can be sufficiently compensated for, or that ensures the polling of the status can be performed. When, for example, the CPU chip 11 is the type that is driven at a clock speed of 133 MHz in the normal mode, and that, by being arranged as is shown in FIG. 1, the operational clock can be decreased to one quarter or one eighth. This means that the power consumption of the CPU 11 can be reduced to one quarter or one eighth of that during the normal operation.

Therefore, when the operation state enters condition 1, condition 2, condition 3 or condition 4, the signal generator 50c needs only to throttle the low/high level of the STPCLK# at the interval at which the operation clock of 1xx MHz is thinned out to one quarter or one eighth.

(D) Power Management Operation of CPU 11

The hardware arrangement and the software arrangements of the computer system 100 that embodies the present invention have been explained. In this division, the processing of the present invention will be described in association with the operation of the system 100.

(1) At the time of data transfer with the FDD 27

An explanation will be given, while referring to FIGS. 2A and 9A, for the reduction of the performance of the CPU 11 when it performs a data transfer to the FDD 27.

Figure 2A:
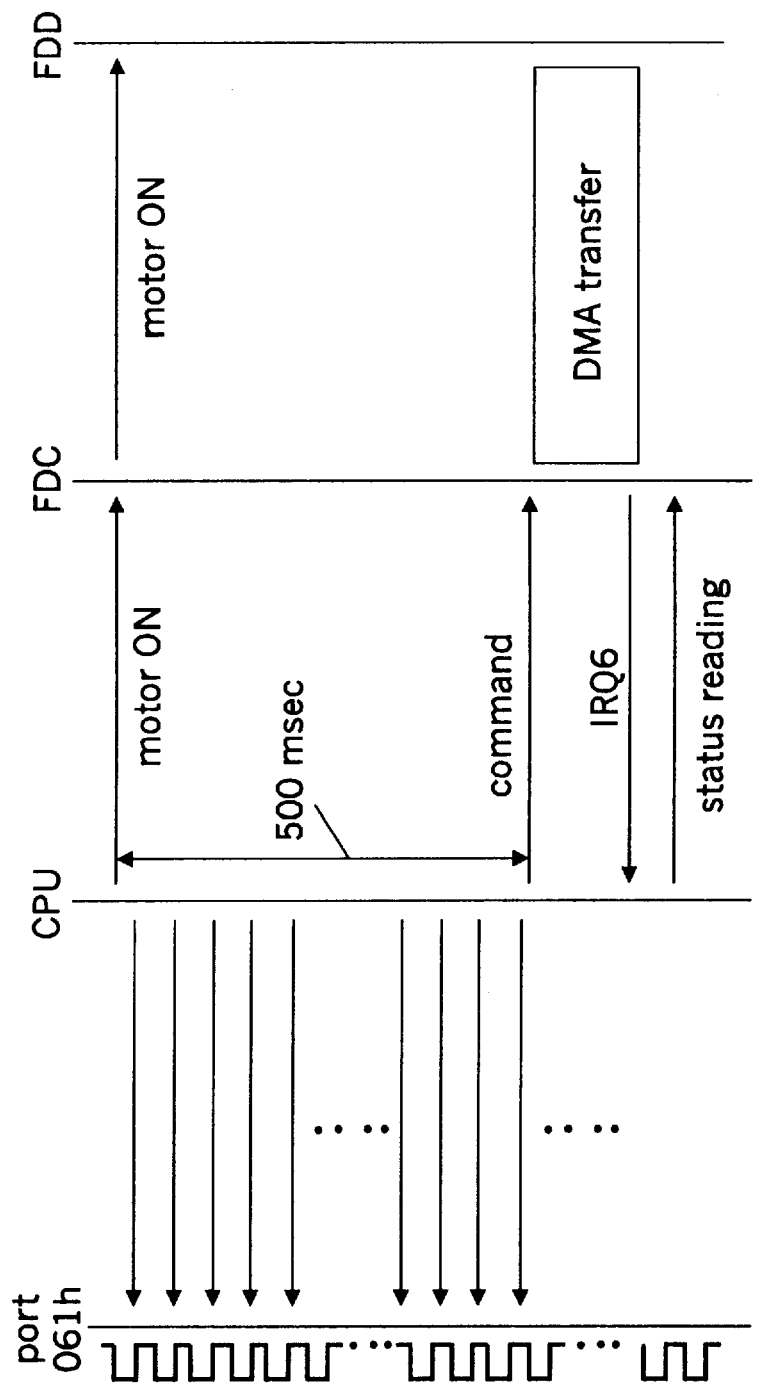
FIGS. 2A–2C are diagrams for describing the performance of a handshaking operation, with FIG. 2A showing the handshaking with the FDC.

As is shown in FIG. 2A, to access the FDD 27, the CPU 11 first transmits a command (for setting a motor-ON bit) to the FDC 26. Then, the CPU 11 (more specifically, the BIOS that controls the hardware) counts a 500 msec delay that is taken to stabilize the rotation of the motor. While the time is being counted by the BIOS, I/O port 061h is sequentially accessed, and the condition determiner 50b therefore maintains the condition 1 (see FIG. 9A). As a result, the signal generator 50c throttles the STPCLK# at predetermined intervals, so that the performance of the CPU 11 is reduced to one quarter or one eighth of its performance in the normal mode.

(2) At the time the keyboard 29 is accessed

The reduction of the performance of the CPU 11 when it accesses the keyboard 29 will now be explained while referring to FIGS. 2B and 9B.

Figure 2B:
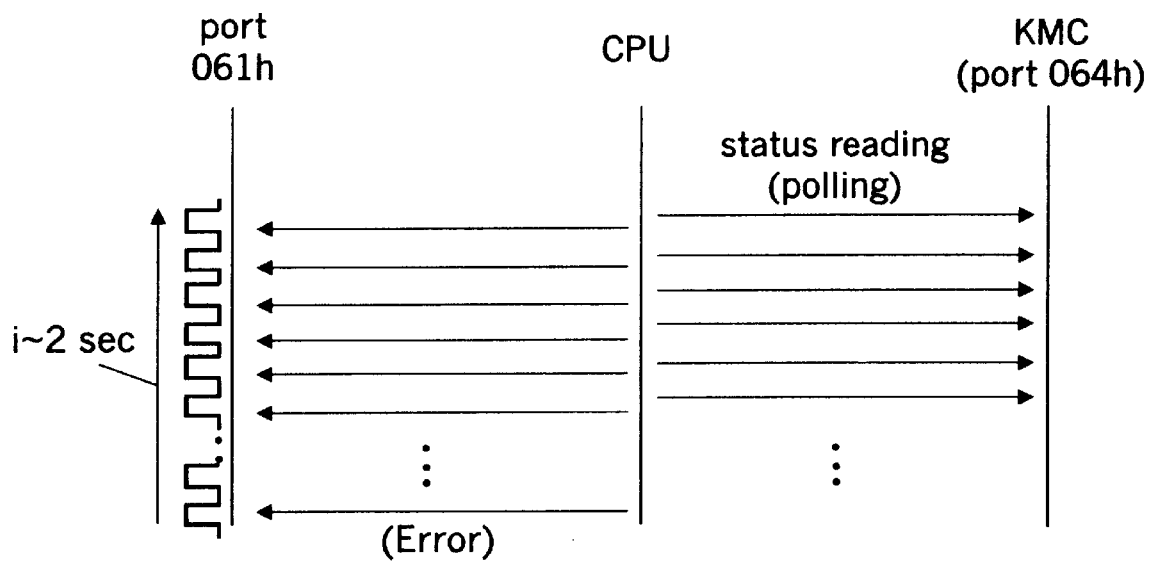

As is shown in FIG. 2B, when the CPU 11 is to access the keyboard 29, the status reading (i.e., the polling of I/O port 064h) of the KMC 28 and the access of I/O port 061h are alternately repeated. The repetition of the two bus cycles continues until the confirmation of the status is successful or until a 2 second period elapses and the status cannot be recognized. Therefore, in this handshaking period, as is shown in FIG. 9A, the condition determiner 50b simply reciprocates between condition 1 and condition 2. As a result, the signal generator 50c throttles the STPCLK# at predetermined intervals, and the performance of the CPU 11 is then reduced to one quarter or one eighth of its performance in the normal mode.

(3) At the time of a data transfer with the HDD 21

Figure 2C:
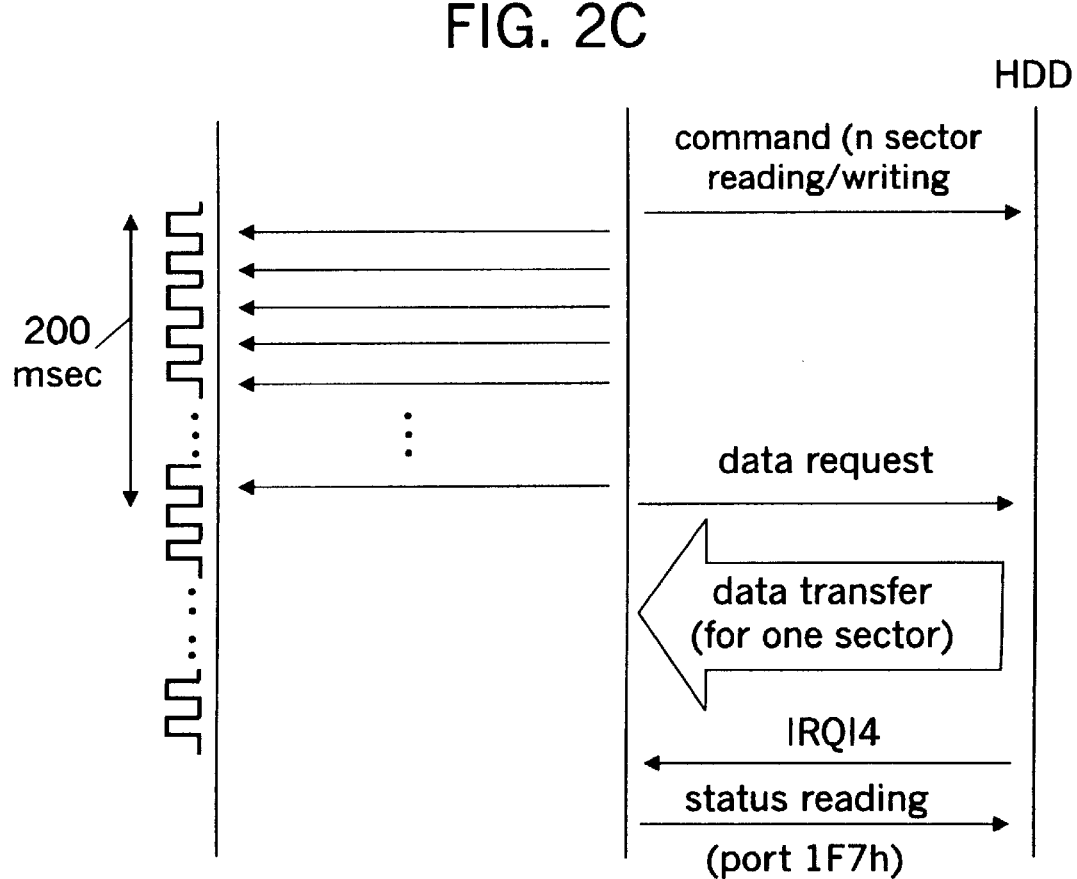

The reduction of the performance of the CPU 11 when it performs the data transfer with the HDD 21 will now be explained while referring to FIGS. 2C, 9B and 10.

Figure 10:
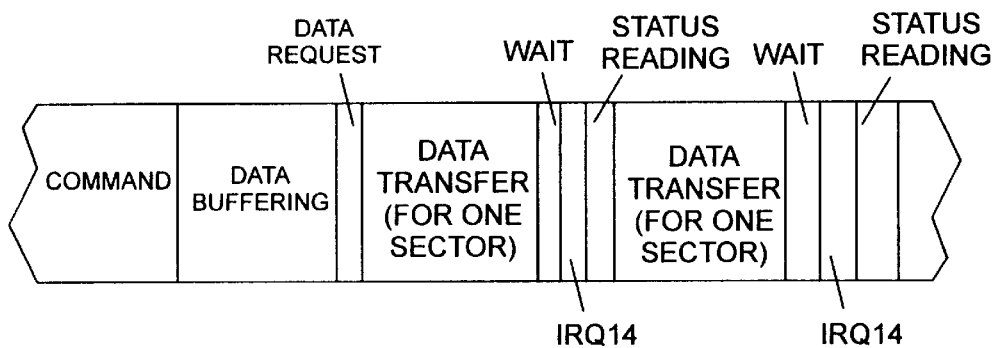
FIG. 10 is a diagram showing phases in asynchronous communication between the CPU 11 and HDD 21.

FIG. 10 is a specific diagram illustrating individual phases at the time asynchronous communication is taking place between the CPU 11 and the HDD 21. In the data buffering period that is shaded in FIG. 10, the BIOS performs a timing measurement of 200 msecs, and in the same manner as in (D)(1), the performance of the CPU 11 can be reduced.

The double shaded portion in FIG. 10 is a data transfer phase. One data transfer phase consists of 256 times of sequential accesses of I/O port 1F0h. While the accessing of the I/O port 1F0h continues, the condition determiner 50b maintains condition 3, as is shown in FIG. 9B. As a result, the signal generator 50c throttles the STPCLK# at predetermined intervals, and the performance of the CPU 11 is reduced to one quarter or one eighth of its performance in the normal mode.

(4) When the polling is performed on the status register of the FDC 26

The reduction of the performance of the CPU 11 when it polls the status register of the FDC 26 will now be explained while referring to FIGS. 11 and 9C.

Figure 11:
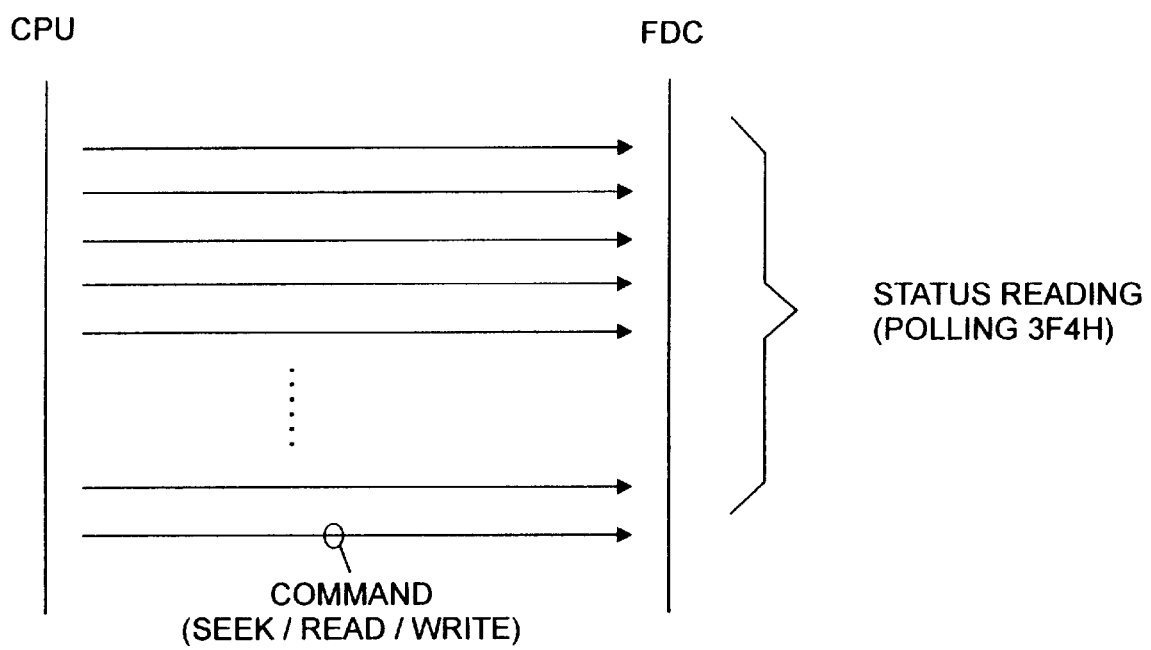
FIG. 11 is a diagram showing a handshaking operation when the CPU 11 transmits a command (seek/read/write) to FDC 26.

As is shown in FIG. 11, when the CPU 11 transmits a command to the FDC 26, the status reading of the FDC 26 (i.e., the polling of I/O port 3F4h) is repeated in advance. This bus cycle continues until the status is confirmed or until the polling has been repeated at predetermined number of times or more and the routine jumps to an error routine.

During such polling, the condition determiner 50b maintains condition 4, as is shown in FIG. 9C. As a result, the signal generator 50c throttles the STPCLK# at predetermined intervals, and the performance of the CPU 11 is reduced to one quarter or one eighth of its performance in the normal mode.

The CPU 11 in this embodiment effects power management by reducing the operational clock, or by halting the operation of only one part of the functional unit 11a. However, the present invention is also applicable to a CPU chip of the type that reduces the operational clock for the entire chip or that halts the entire operation can provide the same effect. This would be understood by one having an ordinary skill in the art.

The assignment of I/O port addresses and the IRQ levels, which are described in this specification, conforms to the standards of compatible machines of the IBM PC/AT series.

As is described above, according to the present invention, provided is an information processing system that has a power saving function that lowers the power consumed by a CPU by reducing its operating clock frequency.

According to the present invention, provided is the information processing system that can reduce the operating clock frequency of the CPU, or halt the operation of the CPU, while the system satisfactorily responds to power management and system security requests.

In addition, according to the present invention, provided is the information processing system that can reduce the operating clock frequency of the CPU, or halt the operation of the CPU, in accordance with an appropriate timing by exactly understanding (or measuring) the operational state of the CPU.

That is, the information processing system according to the present invention provides the low power consumption by the CPU in units of one bus cycle.

As a secondary effect that is provided by the present invention, no design change of software is required. The asynchronous communication between the CPU and the peripheral devices may occur at any time while the CPU is executing the BIOS or an application program. Taking all the conditions into account, it is almost impossible, because of time and economical factors, for the design of all the software that may be installed into the system to be so changed as to "reduce the performance of the CPU chip during the asynchronous communication". In the present invention, a special hardware component, such as a PM-LSI chip is employed to accomplish the power saving operation for the CPU chip. Thus, the software programs do not need to be aware of the operating rate of the CPU, and no software design changes are required.

The present invention has been described in detail while referring to a specific embodiment. However, it should be obvious to one having ordinary skill in the art that various modifications or revisions of the embodiment are possible within the scope of the present invention. The present invention can be employed for various electric/electronic devices, for example: facsimile apparatuses; various cordless devices, such as portable ratio terminals, cordless telephones, electronic notebooks and portable video cameras; and word processors. That is, although the present invention has been disclosed by using an example, it should not be limited to that example. To fully understand the subject of the present invention, the claims should be referred to.

What is claimed is:

1. An information processing system comprising:
   a CPU having two operation modes, a normal mode wherein said CPU is operated at a first operating clock rate, and a power saving mode wherein said CPU is operated at a second operating clock rate which is slower than said first operating clock rate;
   at least one peripheral device;
   a bus employed for communication between said CPU and said peripheral device, wherein said CPU is operative to initiate an asynchronous bus cycle between said CPU and said peripheral device;
   a bus cycle detector for monitoring a bus cycle on said bus, detecting whether said bus cycle is a predetermined asynchronous bus cycle in which an activity of said CPU is reduced and notifying a condition determiner of said detection;
   said condition determiner being operative to receive said notification and determine whether said CPU should be in said normal mode or said power saving mode in said detected bus cycle; and
   a signal generator for providing, to said CPU, a control signal for changing said CPU's operational mode in accordance with a determination result by said condition determiner.

2. The information processing system according to claim 1, wherein said condition determiner determines said operational mode of said CPU to be a power saving mode in accordance with the detected result by said bus cycle detector, and, in accordance with said determination result, said signal generator provides a control signal to have said CPU enter said power saving mode.

3. The information processing system according to claim 2, wherein said bus cycle detector detects a bus cycle for accessing I/O port 061h as said predetermined bus cycle in which the activity of said CPU is reduced.

4. The information processing system according to claim 2, wherein said bus cycle detector detects a bus cycle for counting a timing for a handshaking operation as said predetermined bus cycle in which the activity of said CPU is reduced.

5. The information processing system according to claim 2, further comprising at least a hard disk drive as said peripheral device, wherein said bus cycle detector detects a bus cycle for accessing I/O port 1F0h as said predetermined bus cycle in which the activity of said CPU is reduced.

6. The information processing system according to claim 2, further comprising at least a hard disk drive as said peripheral device, wherein said bus cycle detector detects a bus cycle in which a data port for said hard disk drive is accessed as said predetermined bus cycle in which the activity of said CPU is reduced.

7. The information processing system according to claim 2, further comprising, as said peripheral devices, at least a floppy disk controller and a floppy disk drive, wherein said bus cycle detector detects a bus cycle in which I/O port 3F4h is accessed as said predetermined bus cycle in which the activity of said CPU is reduced.

8. The information processing system according to claim 2, further comprising, as said peripheral devices, at least a floppy disk controller and a floppy disk drive, wherein said bus cycle detector detects a bus cycle in which a status register of said floppy disk controller is accessed as said predetermined bus cycle in which the activity of said CPU is reduced.

9. The information processing system according to claim 3, wherein in accordance with a detection of said bus cycle, said condition determiner shifts the operational mode of said CPU to a power saving mode, and inhibits a return to a normal mode until a bus cycle other than said previously detected bus cycle is detected twice in succession.

10. The information processing system according to claim 4, wherein in accordance with a detection of said bus cycle, said condition determiner shifts the operational mode of said CPU to a power saving mode, and inhibits a return to a normal mode until a bus cycle other than said previously detected bus cycle is detected twice in succession.

11. The information processing system according to claim 5, wherein said condition determiner shifts the operational mode of said CPU to said power saving mode, in accordance with said detection result for said bus cycle, and returns said operating mode to said normal mode when another bus cycle is detected.

12. The information processing system according to claim 6, wherein said condition determiner shifts the operational mode of said CPU to said power saving mode, in accordance with said detection result for said bus cycle, and returns said operating mode to said normal mode when another bus cycle is detected.

13. The information processing system according to claim 7, wherein said condition determiner shifts the operational mode of said CPU to said power saving mode, in accordance with said detection result for said bus cycle, and returns said operating mode to said normal mode when another bus cycle is detected.

14. The information processing system according to claim 8, wherein said condition determiner shifts the operational mode of said CPU to said power saving mode, in accordance with said detection result for said bus cycle, and returns said operating mode to said normal mode when another bus cycle is detected.

15. The information processing system according to claim 1, wherein said power saving mode is an operating mode in which a frequency of an operational clock for at least one unit part inside said CPU is reduced or an operation is halted.

* * * * *